May 5, 1925.

J. L. G. DYKES 1,536,087

PROCESS AND APPARATUS FOR VULCANIZING ARTICLES

Filed Sept. 7, 1920    3 Sheets-Sheet 2

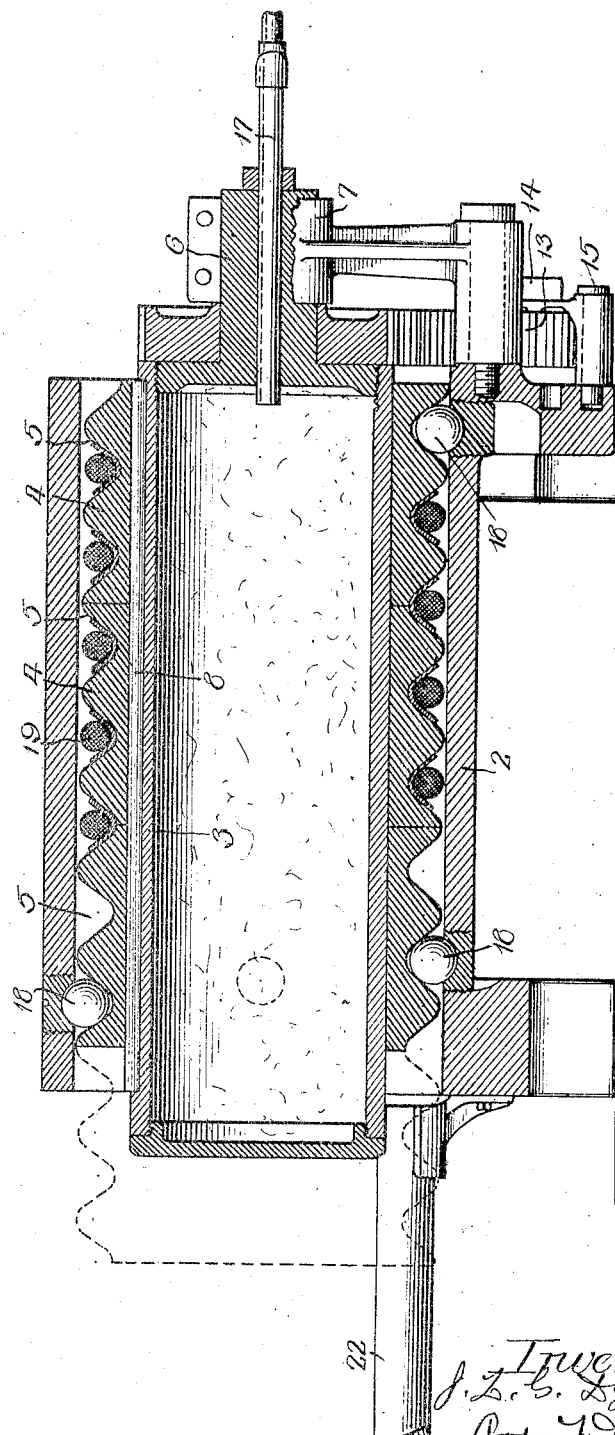

Patented May 5, 1925.

1,536,087

UNITED STATES PATENT OFFICE.

JOHN L. G. DYKES, OF CHICAGO, ILLINOIS.

PROCESS AND APPARATUS FOR VULCANIZING ARTICLES.

Application filed September 7, 1920. Serial No. 408,764.

*To all whom it may concern:*

Be it known that I, JOHN L. G. DYKES, a citizen of the United States of America, and a resident of Chicago, Illinois, have invented a certain new and useful Improvement in Processes and Apparatus for Vulcanizing Articles, of which the following is a specification.

This invention relates to the apparatus and method of making inner flaps for pneumatic tires. As is well known, pneumatic tires of certain kinds are provided with an inner inflatable tube, and the edges of the tire casing which is ordinarily divided at the base, are held in a rim, and provided with an inner flap to prevent the inner tube from coming in contact with said rim. The said flap ordinarily consists of fabric and rubber moulded and vulcanized in the proper or desired shape, and the flap is usually attached at one edge thereof to one side of the tire sheath or casing so that it is loose at the other side to permit the insertion and removal of said inflatable tube. Various schemes have been proposed and employed for the manufacture of these pneumatic tire flaps. Preferably, a flap of this kind is moulded and vulcanized in such a manner that it naturally assumes an annular form with its edges outward so that when in the tire it is like a hoop which is trough-shaped in cross section, and being moulded and vulcanized in this form is not under tension. Other methods approximate this result, more or less, and in some instances the flaps are somewhat distorted and are under some tension when in use in the tire, depending upon the process or method of manufacture. Various efforts have been made to manufacture these flaps as cheaply as possible without reducing their efficiency.

Generally stated, therefore, the object of the invention is to provide an improved process or method and apparatus for manufacturing pneumatic tire flaps in such a manner that they can not only be produced much more cheaply, and in greater quantities, than heretofore, but also in such form that they will be satisfactory and reliable in use.

It is also an object to provide certain details and features of construction and combinations tending to increase the general efficiency and the desirability of a method and apparatus of this particular character and for this particular purpose.

To these and other useful ends the invention consists in matters hereinafter set forth and claimed, and shown in the accompanying drawings, in which—

Fig. 4 is a longitudinal vertical section on line 4—4 in Fig. 1.

Figure 1:
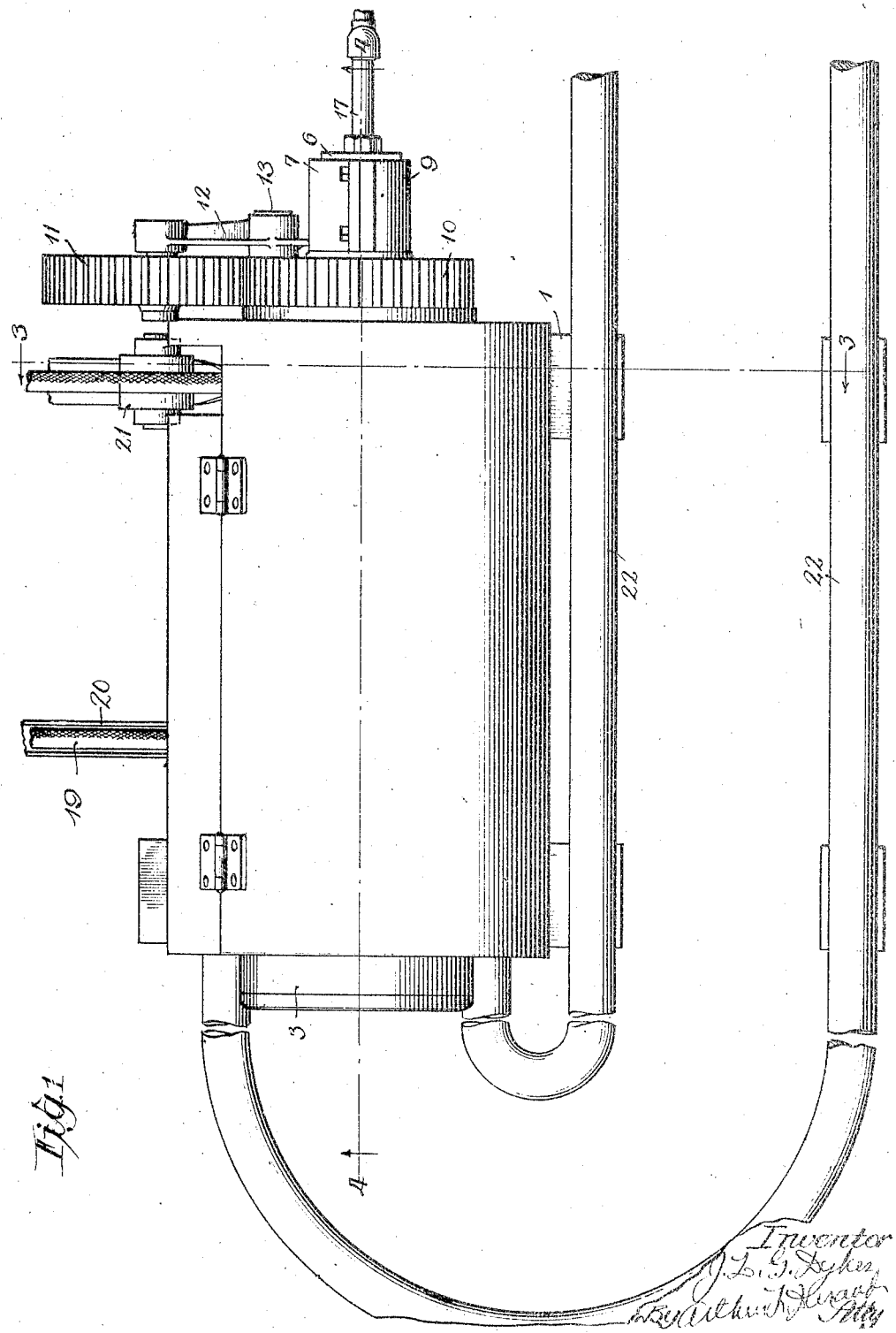
Fig. 1 is a plan of a tire flap making apparatus embodying the principles of the invention.
Figure 2:
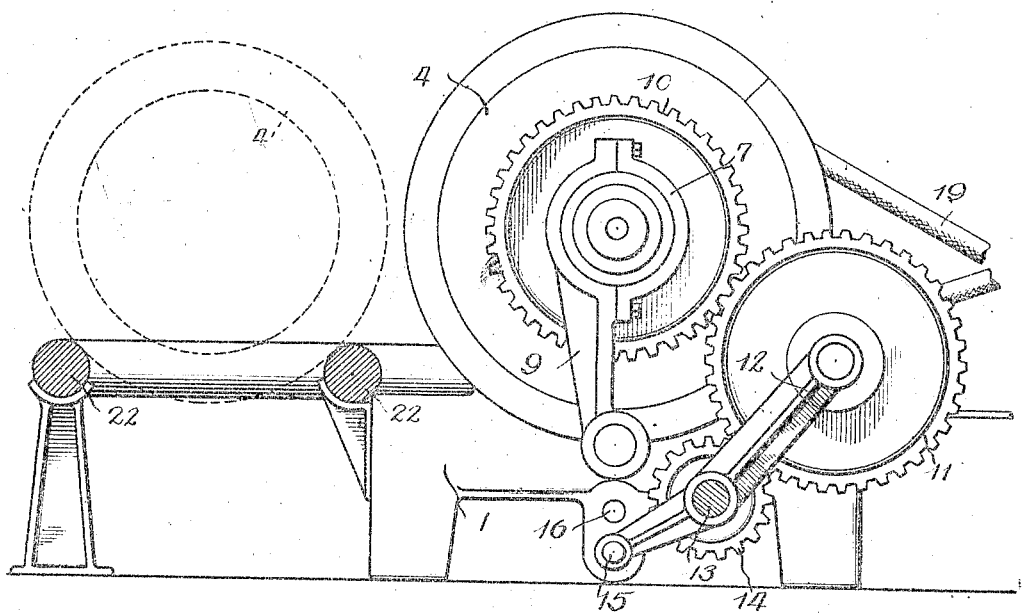
Fig. 2 is an end elevation of the same.
Figure 3:
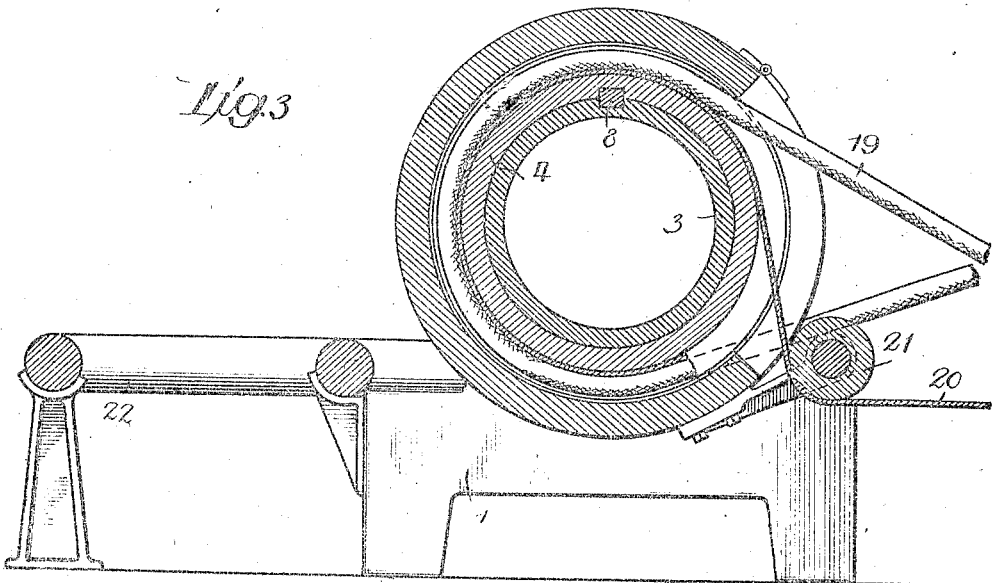
Fig. 3 is a transverse section on line 3—3 in Fig. 1.

As thus illustrated, the invention comprises a base 1 upon which is suitably mounted a cylinder or drum 2 disposed horizontally thereon, it being stationary and rigid therewith. A rotary drum is arranged within said stationary drum, said rotary drum comprising an inner cylinder 3 provided with cylindric outer sections 4, these sections having their cylindric surfaces provided with a spiral groove 5 of suitable depth and width. The cylinder 3 has a stem or journal 6 at the receiving end thereof, mounted in a bearing 7 which can be readily separated or opened to permit insertion of the sections 4 within the outer cylinder, and upon the inner cylinder 3, the latter having a longitudinal spline 8 to permit the sections to slide longitudinally thereon, but whereby said sections must rotate with the inner cylinder. The bearing 7 is preferably carried on a swinging arm 9 which can be swung out of the way to permit the introduction of the sections 4 within the outer cylinder. The stem or journal 6 has a gear wheel 10 which engages the gear wheel 11 carried on the swinging arm 12, the latter being supported by the drive shaft 13 which is provided with a pinion 14 to engage the gear wheel 11, whereby the rotation of this shaft causes the slower rotation of the rotary drum. The arm 12 has its lower end provided with a removable pin 15 which can be inserted and removed to permit the gear wheel 11 to be disengaged from the gear wheel 10 when such is necessary or desirable, as in the operation of introducing more sections 4 within the outer cylinder. The arm 12 can be supported in its depressed position by inserting the pin 15 in the hole 16 formed in the base or body of the machine. A steam pipe 17 extends through the stem or journal 6 to supply steam to the interior of the cylinder 3 for vulcanizing purposes. Ball bearings 18, of any suitable character, engage the spiral groove 5 in the sections 4 to cause the latter to gradually shift to the left, as shown in dotted lines in Fig. 4, by the screw action obtained with this construction, so that the sections 4 gradually slide to the left on the cylinder 3, thus making room at the right for fresh sections. These sections 4 can be of any suitable, known or approved material, and are of less diameter than the interior of the stationary outer cylinder 2, so that the entire rotary drum can rotate freely about its horizontal and longitudinal axis. An endless belt 19, preferably cylindric in cross section, is wound upon the rotary drum, in the spiral groove 5, and is supported outside of the machine on a spiral roller (not shown) or in any suitable manner.

In use, the web 20, in the form of a long strip of fabric and rubber, supplied from any suitable source, such as a large roll, is fed under the guide roller 21 at one side of the machine, and then upwardly to a point where it will catch and hold under the belt 19, this causing the web to feed into the spiral groove 5 under the belt. Rotation of the cylinder 3 will cause the web to be wound upon the rotary drum in the spiral groove formed in the outer removable sections 4, and the belt 19 will stretch the web and cause it to assume a trough-like form in cross section, as shown in Fig. 4, as well as the spiral form which it assumes from being wound in the spiral groove. The steam in the cylinder 3 furnishes heat enough to vulcanize the rubber of the web, in a manner that will be readily understood, and the sections 4 gradually slide to the left, the rotation of the drum being slow enough, of course, to keep the web in the machine long enough to insure proper vulcanization thereof. As the sections 4 gradually emerge from the left hand end of the machine, they will drop down, and the spiral and vulcanized web thereon can be removed in any suitable manner, and as the web is thus fed out of the machine in spiral form it can be cut off from time to time as may be necessary or desirable. As shown, a rack comprising a pair of cylindric guides 22 is provided in position to receive the discharged sections 4, with the vulcanized web thereon, and with this construction the spirally grooved sections with the spiral and vulcanized web thereon will gradually feed around and accumulate on the rack, the latter being curved around from the end of the machine and then arranged to extend parallel with the horizontal and longitudinal axis about which the drum rotates. Other arrangements, of course, can be provided for taking care of the rotary drum sections as fast as they are pushed out of the discharge end of the machine by the screw action of the ball bearings 18, the latter causing the sections 4 to gradually work along to the left as the drum is rotated.

The web thus stretched and shaped and vulcanized can be cut into lengths suitable for the flaps of the pneumatic tires. The flaps will have the desired trough-like formation in cross section, and the spiral formation will not interfere with their use in the pneumatic tires, as the two ends of each flap can be brought together, so that when in use in the tire the flap will have the annular or ring-like shape necessary to enable it to conform to the rim and base portions of the tire. The entire spiral web, or any section thereof, will appear annular, of course, when viewed from the side—that is, when viewed in the direction of the axis of the spiral. When viewed at right angles to said axis, the web, or any section thereof, appears spiral; but the convolutions are all of the same diameter, and this is the same diameter, or approximately so, that the flap has when in the tire. Thus the invention contemplates the reduction of a long straight web to spiral form, and the stretching and shaping of the same to make it trough-like in cross section, and the conversion of this spiral and trough-shaped web into flaps for pneumatic tires. The trough-like formation brings the edges toward each other, so that they are outward, and thus the trough or groove is on the outside of the spiral web. This is also true, of course, of the finished product, as in the finished flap the edges thereof are of greater diameter than the base or bottom of the trough or channel thus formed by the stretching of the web in the spiral groove of the machine. The apparatus or machine may, therefore, be of any suitable character, that shown being merely illustrative of the invention.

It will be seen that the materials, of any suitable or desired character, for the production of any desired article of manufacture, are caused to travel a spiral path of travel formed in any suitable or desired manner, but preferably involving a rotary drum and endless belt-like means wound spirally around the drum, whereby the spiral path of travel is provided for the rubber or similar materials to be vulcanized to produce the desired articles of manufacture.

Consequently, the unvulcanized materials feed in at one point, while at the same time the vulcanized materials feed out at another point, and the process is continuous and there is practically no limit to the length of the thing or things to be vulcanized.

The apparatus is shown more or less diagrammatically, of course, for the broad idea of using a spiral path of travel for the thing or things to be vulcanized or treated can be employed in any suitable apparatus and for any suitable or desired purpose and for vulcanizing or for suitably forming or treating any desired article or articles of manufacture.

What I claim as my invention is:—

1. The process of making pneumatic tire inner flaps, comprising the stretching and shaping of a flat web of fabric and rubber sheet material to render the same annular when viewed axially from the side, and trough-like with the channel thereof facing outward when viewed in cross section, and vulcanizing the web while rotating in this condition.

2. The process specified in claim 1, in which said web is subdivided into length after being vulcanized as stated, each length being sufficient for a flap.

3. The process specified in claim 1, in which the shaping of the web renders it spiral in form, and in which this web is supplied from a continuous strip and is rotated about the axis of the spiral during the stretching and shaping and vulcanizing thereof.

4. The process specified in claim 1, in which the shaping and stretching operation reduces the web to spiral form during the rotation and vulcanizing thereof.

5. The process specified in claim 1, in which the web is shaped progressively along the length thereof.

6. Apparatus for making pneumatic tire inner flaps, comprising a rotary drum having a spiral groove therein, means to feed the fabric and rubber web to said groove, and means to press the web into said groove, said pressing means and said groove cooperating to make the web trough-like in cross section, with the channel thereof facing outward, and means for rotating said drum to simultaneously draw the unformed material into the apparatus and discharge the formed material therefrom.

7. Apparatus as specified in claim 6, said pressing means comprising a belt which is wound spirally in said groove.

8. Apparatus as specified in claim 6, said spiral groove being provided by sections which are splined on the drum and which are gradually fed along from the receiving end of the drum to the delivery end thereof, so that these sections are discharged successively from the drum with the stretched web thereon, and means to supply heat to said drum to vulcanize the web.

9. Apparatus as specified in claim 6, and means to supply heat to said drum to vulcanize the web while following said groove.

10. The process of vulcanizing rubber material, comprising the establishing of an area of sufficient heat to vulcanize the material, feeding the material spirally to said area, thereby causing the material to follow a spiral path while rotating about the axis of the spiral, and vulcanizing the material while thus moving through said area in spiral formation, whereby the unvulcanized material enters at one end of said spiral path, while the vulcanized material leaves at the other end of the spiral.

11. The process specified in claim 10, and stretching said materials to make them trough shaped in cross section with the channel thereof facing outward.

12. The process specified in claim 10, and compressing said materials by moving means spirally applied to progressively vulcanize the materials in the desired form.

13. In apparatus for shaping materials in the desired form, the combination of forming means to receive the materials, and spiral means to press the materials into said forming means and for causing the materials to follow a spiral path of travel while being shaped.

14. Apparatus as specified in claim 13, in combination with heating means to vulcanize said materials during the forming thereof, whereby the unvulcanized materials feed in at one end of said path of travel, while the vulcanized materials are at the same time fed out at the other end of said path.

15. Apparatus as specified in claim 13, said forming means being a spiral groove, and said pressing means being flexible to follow said groove, together with instrumentalities for rotating the forming means about the axis of the spiral.

16. Apparatus for vulcanizing materials, comprising a rotary core, means for feeding the materials spirally to said core, means to feed the core and the materials axially thereof, and means to heat said core to vulcanize said materials in spiral form.

17. In apparatus for vulcanizing rubber articles, the combination of means to establish a spiral path of travel for the stock from which the desired article is to be made, means for feeding the stock to said spiral path of travel, means in the form of a belt traveling spirally over the stock, and means for heating the stock to vulcanizing temperature while traveling in said path.

18. Apparatus for vulcanizing rubber articles, comprising means to form a spiral forming and vulcanizing path for the stock from which the desired article is to be made, including a belt wound spirally to travel with the stock, and means for feeding the stock to said path of travel.

19. The process of vulcanizing rubber articles, comprising feeding the stock along a spiral path of travel and heating the stock to vulcanizing temperature while thus traveling in spiral formation in said path, so that the stock is vulcanizing while being wound in spiral formation.

20. In apparatus for vulcanizing rubber articles, the combination of means to support the stock from which the articles are to be made, and forming means comprising a belt shaped in cross section to co-operate with said supporting means to give the stock the shape desired for said articles, together with means for causing said belt to follow a spiral path of travel, and means for supplying heat to vulcanize the stock while under pressure by said belt and while following said path of travel.

21. A structure as specified in claim 20, said belt being wound spirally, and said supporting means being formed to receive the stock spirally thereon, so that the stock follows a spiral path of travel between said supporting means and said belt, and means for turning the apparatus about the axis of the spiral during the vulcanizing operation.

22. A structure as specified in claim 20, in combination with mechanism for driving said belt to cause the spirally wound portion thereof to revolve around the axis of the spiral during the vulcanizing operation.

23. In apparatus for vulcanizing a long flexible rubber or rubber composition article, the combination of a vulcanizing drum having a circumferential forming and vulcanizing spiral groove, means to feed the article to said groove, means to rotate the drum during the vulcanizing operation.

24. The process of vulcanizing a long rubber or rubber composition article, comprising the establishment of a vulcanizing area of sufficient temperature, feeding said article lengthwise through said area, along a spiral path of travel, and thus keeping said article moving lengthwise during the vulcanization thereof, so that the vulcanization is progressive from one end of said article to the other end thereof, the unvulcanized material feeding in at one end of said spiral path of travel, and the vulcanized material feeding out at the other end of said path of travel.

25. The process of vulcanizing a rubber or rubber composition article, comprising the vulcanization of said article in successive stages, along a spiral path of travel, so that the vulcanization progresses from one end of said article to the other end thereof.

26. In vulcanizing apparatus, the combination of instrumentalities to form a spiral path of travel for the materials to be vulcanized, devices for causing the materials to have movement along said path of travel at the desired rate of speed for vulcanizing purposes, and means to apply vulcanizing heat to said materials while moving along said spiral path of travel, whereby the process is continuous and the material simultaneously feed in at one point and feed out at another point.

27. A structure as specified in claim 26, said instrumentalities comprising a rotary drum around which said spiral path of travel is formed, so that the axis of the spiral is coincident with the axis of the drum, and said drum having an interior heating chamber forming part of said means for supplying vulcanizing heat to said materials.

28. A structure as specified in claim 26, comprising an endless belt wound spirally to hold said materials in said spiral path of travel thereof.

29. In apparatus for forming materials into the desired shape, the combination of instrumentalities to form a spiral path of travel for the materials to be treated, devices for causing the materials to have movement along said path of travel at the desired rate of speed for treatment thereof, and means for operating said devices during treatment of the materials, whereby the process is continuous and the materials are fed in and treated at one point and fed out in formed and treated condition at another point, while the materials between these two points are moving along said path to receive the desired treatment.

JOHN L. G. DYKES.